(12) United States Patent
McCullough

(10) Patent No.: US 7,272,786 B1
(45) Date of Patent: Sep. 18, 2007

(54) METADATA, MODELS, VISUALIZATION AND CONTROL

(75) Inventor: Sean M. McCullough, Austin, TX (US)

(73) Assignee: Vignette Corporation, Austin, TX (US)

(*) Notice: Subject to any disclaimer, the term of this patent is extended or adjusted under 35 U.S.C. 154(b) by 584 days.

(21) Appl. No.: 09/681,762

(22) Filed: Jun. 1, 2001

Related U.S. Application Data

(60) Provisional application No. 60/219,494, filed on Jul. 20, 2000.

(51) Int. Cl.
*G06N 3/00* (2006.01)

(52) U.S. Cl. ..................................... 715/513

(58) Field of Classification Search ................ 715/500, 715/512, 513, 517, 523, 530; 345/710, 711, 345/715, 760, 440, 153, 133
See application file for complete search history.

(56) References Cited

U.S. PATENT DOCUMENTS

| | | | | |
|---|---|---|---|---|
| 5,283,560 A | * | 2/1994 | Bartlett ....................... | 345/729 |
| 5,557,717 A | * | 9/1996 | Wayner ....................... | 700/92 |
| 5,640,566 A | * | 6/1997 | Victor et al. ................ | 717/113 |
| 5,732,218 A | | 3/1998 | Bland et al. | |
| 5,860,073 A | * | 1/1999 | Ferrel et al. ................ | 715/522 |
| 6,041,335 A | * | 3/2000 | Merritt et al. .............. | 715/512 |
| 6,043,817 A | * | 3/2000 | Bolnick et al. ............. | 345/788 |
| 6,112,186 A | | 8/2000 | Bergh et al. | |
| 6,119,103 A | | 9/2000 | Basch et al. | |
| 6,144,962 A | | 11/2000 | Weinberg et al. | |
| 6,154,738 A | * | 11/2000 | Call .............................. | 707/4 |
| 6,199,081 B1 | * | 3/2001 | Meyerzon et al. .......... | 715/513 |
| 6,205,472 B1 | * | 3/2001 | Gilmour ..................... | 709/206 |
| 6,209,124 B1 | * | 3/2001 | Vermeire et al. ........... | 717/114 |
| 6,295,061 B1 | * | 9/2001 | Park et al. .................. | 715/764 |
| 6,295,538 B1 | * | 9/2001 | Cooper et al. ........... | 707/104.1 |
| 6,321,206 B1 | | 11/2001 | Honarvar | |
| 6,414,691 B1 | * | 7/2002 | Nakagawa et al. ......... | 345/619 |
| 6,430,539 B1 | | 8/2002 | Lazarus et al. | |
| 6,456,305 B1 | * | 9/2002 | Qureshi et al. ............. | 345/800 |
| 6,509,898 B2 | | 1/2003 | Chi et al. | |
| 6,557,076 B1 | * | 4/2003 | Copeland et al. .......... | 711/118 |
| 6,559,882 B1 | | 5/2003 | Kerchner | |
| 6,573,907 B1 | * | 6/2003 | Madrane ..................... | 715/719 |
| 6,606,657 B1 | | 8/2003 | Zilberstein et al. | |
| 6,618,052 B1 | * | 9/2003 | Walls .......................... | 345/440 |

(Continued)

OTHER PUBLICATIONS

Clark, "XSL Transformations (XSLT) Version 1.0," W3C, pp. 1-87, 1999.*

(Continued)

*Primary Examiner*—Stephen Hong
*Assistant Examiner*—Kyle Stork
(74) *Attorney, Agent, or Firm*—Sprinkle IP Law Group

(57) ABSTRACT

A method or data processing system readable medium can be used for modifying a target document. The data processing system medium or method may use metadata and rendering instructions to modify a target document to make the target document more user-friendly, more informative, or easier to track statistics related to the target document. In modifying the document, the rendering instructions render the metadata elements that can be used in the target document. In some embodiments, different sets of metadata and rendering instructions may be used with the same target document.

31 Claims, 2 Drawing Sheets

U.S. PATENT DOCUMENTS

| | | |
|---|---|---|
| 6,629,136 B1 | 9/2003 | Naidoo |
| 6,640,215 B1 | 10/2003 | Galperin et al. |
| 6,718,516 B1 * | 4/2004 | Claussen et al. ............ 715/513 |
| 6,732,331 B1 * | 5/2004 | Alexander .................. 715/513 |
| 6,757,740 B1 | 6/2004 | Parekh et al. |
| 6,839,682 B1 | 1/2005 | Blume et al. |
| 6,859,909 B1 * | 2/2005 | Lerner et al. ............... 715/512 |
| 6,898,790 B1 * | 5/2005 | Cheong et al. ............. 718/100 |
| 7,058,944 B1 * | 6/2006 | Sponheim et al. .......... 718/100 |
| 2001/0037321 A1 | 11/2001 | Fishman et al. |

OTHER PUBLICATIONS

Adler, et al., "Extensive Stylesheet Language (XSL)," Version 1.0, W3C, pp. 1-11, 2000.

Bray, et al., "Extensive Markup Language (XML) 1.0," W3C, pp. 1-32, 1998.

Clark, XSL Transformations (XSLT), Version 1.0, W3C, pp. 1-87, 1999.

Cabena, Peter et al., Intelligent Miner for Data Applications Guide, IBM RedBook SG24-5252-00, Mar. 1999.

Datasage.com News and Events—DataSage Releases netCustomer, the 1st Individualization Solution for E-Commerce, retrieved Feb. 16, 2005 from Archive.org , 3 pgs, Aug. 2, 1999.

Datasage.com—Executive Overview—Retail, Retail Data Mining Executive Overview, retrieved Feb. 16, 2005 from Archive.org, 7pgs, Dec. 1998.

Gallant, Steve et al., Successful Customer Relationship Management in Financial Applications (Tutorial PM-1), Conference on Knowledge Discovery in Data, ISBN:1-58113-305-7, pp. 165-241, 2000.

Vignette Corporation to Acquire DataSage, Inc., retrieved from Archive.org Feb. 16, 2005, 3 pgs, Jan. 10, 2000.

Chapman, Pete et al., CRISP-DM 1.0—Step-by-step data mining guide, retrieved from www.crisp-dm.org Feb. 17, 2005, pp. 1-78, 2000.

* cited by examiner

METADATA, MODELS, VISUALIZATION AND CONTROL

CROSS REFERENCE TO RELATED APPLICATIONS

This application claims priority under 35 U.S.C. § 119(e) to U.S. Patent Application No. 60/219,494 entitled "Metadata, Models, Visualization and Control" by McCullough filed on Jul. 20, 2000, which is assigned to the current assignee hereof and is incorporated herein by reference.

BACKGROUND OF INVENTION

1. Field of the Invention

This invention relates in general to methods and data processing system readable media, and more particularly, to methods of modifying target documents and data processing system readable media for carrying out those methods.

2. Description of the Related Art

Annotation systems have been used by proxy sites and third-party annotation services. A portal proxy site may replace an expression string with a different expression string. A third-party annotation system may insert carets at points within a web page. A plug-in that is provided by Third Voice, Inc. or others, can be used with a browser for the annotation system. A first visitor can add annotations by right-clicking on the caret and entering his or her annotation. Subsequent visitors that have the plug-in can go that website and see the first visitor's annotation.

The World Wide Web Consortium ("W3C") is in the process of specifying a Document Object Model ("DOM"). The DOM is a platform and language neutral interface that may allow programs and scripts to dynamically access and update the content, structure, and style of documents. The document can be further processed, and the results of that processing can be incorporated back into the presented page. The page can be represented by "Dynamic HyperText Markup Language" or "DHTML." DHTML is a term used by some to describe a combination of HyperText Markup Language ("HTML"), style sheets, and scripts that allow a document to be animated. The DOM has only recently been devised and attempts to define the requirements of the DOM are being addressed by some companies. Currently, specific manners of implementing the DOM have not been fully addressed at this time.

SUMMARY OF INVENTION

A method or data processing system readable medium can be used for modifying a target document. The method or medium may use metadata and rendering instructions to modify a target document to make the target document more user-friendly, more informative, or easier to track statistics related to the target document.

In one set of embodiments, a method of modifying a target document can comprise accessing a target document, a metadata element, and a rendering instruction. The target document may comprise a target element. The method can further comprise locating the target element to which the metadata element applies. The method can further comprise transforming the metadata element into a rendered element by using the rendering instruction. In one specific embodiment, the method may comprise calculating screen coordinates relative to the target document where the rendered element is to be displayed, and the method may further comprise inserting the rendered element into the target document at the screen coordinates. An opacity may be selected such that at least part of the target element may be seen through the rendered element. The method can be iterated for the rest of the target elements within the target document if it has more than one target element.

In another set of embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only are not restrictive of the invention, as claimed.

BRIEF DESCRIPTION OF DRAWINGS

The present invention is illustrated by way of example and not limitation in the accompanying figures, in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A method or data processing system readable medium can be used for modifying a target document. The method or medium may use metadata and rendering instructions to modify a target document to make the target document more user-friendly, more informative, or easier to track statistics related to the target document. In modifying the document, the rendering instructions render the metadata elements that are used in the target document.

A few terms are defined or clarified to aid in understanding the descriptions that follow. A network includes an interconnected set of server and client computers over a publicly available medium (e.g., the internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. Uniform Resource Locators ("URLs") are examples of network addresses. A network site corresponds to a location specified by a network address. A website is a common type of network site. Note that the examples given within this paragraph are for purposes of illustration and not limitation.

Before discussing embodiments of present invention, a hardware architecture for using embodiments is described.

Figure 1:
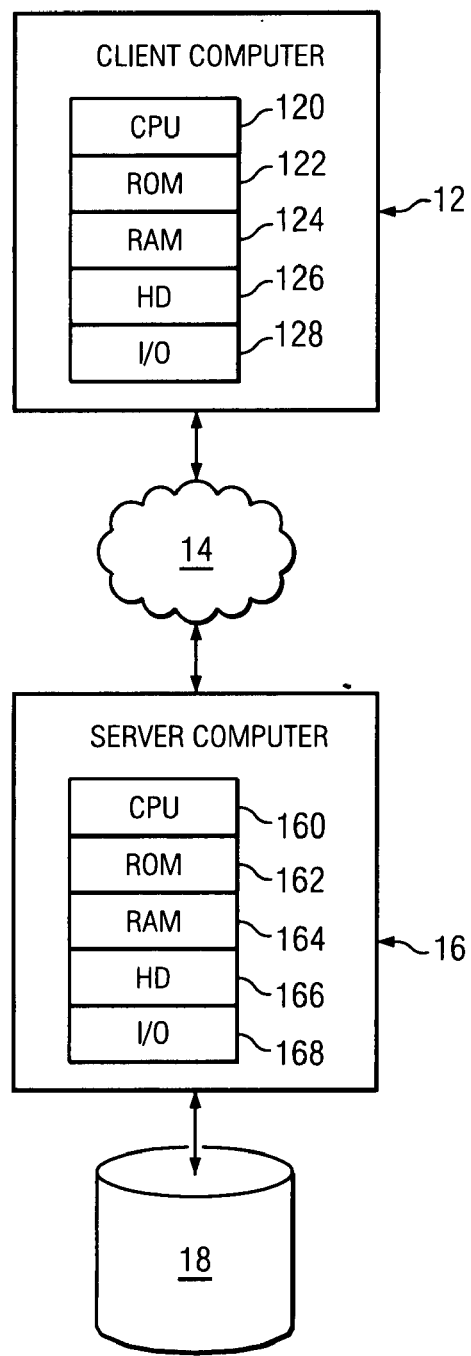
FIG. 1 includes an illustration of a hardware architecture for carrying out a method of modifying a target document.

FIG. 1 illustrates an exemplary architecture and includes a client computer 12 that is bi-directionally coupled to a network 14, and a server computer 16 that is bi-directionally coupled to the network 14 and database 18. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The server computer 16 can include a CPU 160, ROM 162, RAM 164, HD 166, and I/O 168 similar to corresponding items in client computer 12.

Each of the client computer 12 and the server computer 16 is an example of a data processing system. ROM 122 and 162, RAM 124 and 164, HD 126 and 166, and the database 18 include media that can be read by the CPU 120 or 160. Therefore, each of these types of memories includes a data processing system readable medium. These memories may be internal or external to the computers 12 and 16.

Figure 2:
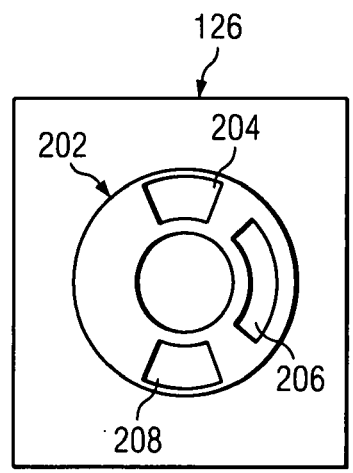
FIG. 2 includes an illustration of a data processing system readable medium including software code.

The methods described herein may be implemented in suitable software code that may reside within ROM 122 or 162, RAM 124 or 164, or HD 126 or 166. FIG. 2 illustrates a combination of software code elements 204, 206, and 208 that are embodied within a data processing system readable medium 202 on HD 126. In addition to those types of memories previously described, the instructions in an embodiment of the present invention may be contained on a data storage device with a different data processing system readable storage medium. The instructions may be stored as software code elements on a DASD array, magnetic tape, floppy diskette, electronic read-only memory, optical storage device, CD ROM or other appropriate data processing system readable medium or storage device.

Figure 3:
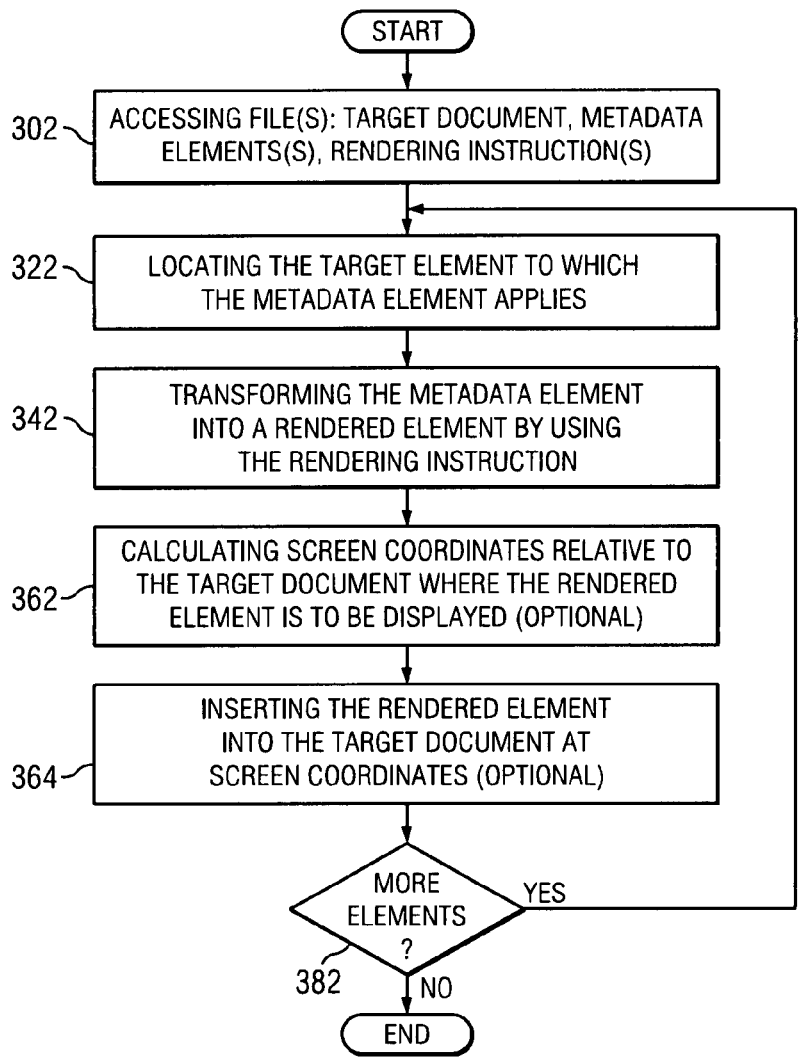
FIG. 3 includes a process flow diagram illustrating a method of modifying a target document.

In an illustrative embodiment of the invention, the computer-executable instructions may be lines of compiled C++, Java, or other language code. Other architectures may be used. For example, the functions of the client computer 12 may be incorporated into the server computer 16, and vice versa. FIG. 3 includes an illustration, in the form of a flow diagram, of the structure of such a software program.

The methods described herein may be implemented by use of code within a plug-in that can be used with a browser, both of which may reside on HD 126 of the client computer 12. The plug-in may be obtained from the server computer 16, a different server computer, or may be created by the user at client computer 12. Alternatively, code within the server computer 16 may perform the acts described in modifying a target document of a different party before transmission to the client computer 12.

Communications between the client computer 12 and the server computer 16 can be accomplished using radio frequency, electronic, or optical signals. When a user (human) is at the client computer 12, the client computer 12 may convert the signals to a human understandable form when sending a communication to the user and may convert input from the user to appropriate signals to be used by the client computer 12 or the server computer 16.

Before turning to the method of modifying a target document, information used for modifying is presented in Appendices I, II, and III, which include examples of a target document, metadata, and rendering instructions, respectively. The target document may be in HTML or a different markup language, such as Wireless Markup Language. When the code in the target document (Appendix I) is processed by a browser without using the methods described herein, a user at client computer 12 may see the following information on his or her screen. "A title" would be centered.

A title

This is a paragraph.

It contains a link to the W3C.

"Link" and "W3C" can be hyperlinks to the same or different specific network addresses. In this example, if the user clicks on either hyperlink, the client computer 12 can send the network address "http://www.w3c.org" over the network 14 to the server computer 16. The server computer 16 may locate and return information corresponding to the network address to the client computer 12.

Appendix II includes an example of metadata that can be used with the target document. The second line defines the target document, which has a network address of "http://www.awebsite.com." These particular metadata include two different web tags, which are examples of metadata elements. The next three lines after the target document line identify the first set of metadata for a web tag. This particular web tag has an identifier "42." The location within the target document is specified as the first heading within the body. Two parameters are specified and include author and date. "Sean" is assigned to the author parameter, and "07/20/2000" is assigned to the date parameter. The middle line is a comment line to aid a code developer in locating where the web tag is to be placed. The last line for the first web tag is a marker that denotes the end of the first web tag.

The second web tag has an identifier of "5." The location within the target document is the second link within the first paragraph of the body. Similar to the prior web tag, there is an author parameter and a date parameter. The values assigned to the author and date parameters are the same as the first web tag. In an alternative embodiment, the second web tag could include different parameters, different values of parameters, or a different number of parameters when compared to the first web tag. A middle line of the second web tag includes a comment line for a code developer. The last of the three lines is a marker to denote the end of the second web tag. Additional, fewer, or other web tags could be used. The last line within the metadata includes an ending tag for the web tags.

Appendix III includes rendering instructions that can be used with the target document in Appendix I and the metadata elements in Appendix II. The rendering instructions are looking for "//WEBTAG." When the client computer 12 processes the metadata in Appendix II, an element called "span" may be used in transforming the metadata elements to rendered elements. In this specific example, a web tag may be replaced with a block that includes a red background. The value for the author parameter may be displayed within the block.

Attention is now directed to FIG. 3 relating to a method of modifying a target document. The method can comprise accessing file(s) as illustrated in block 302. The file(s) can include a target document, metadata element(s), and rendering instruction (s), such as those seen in Appendices I, II, and III. The target document, metadata element(s), and rendering instruction(s) may be part of one file, two files, three files, or more than three files. The method can further comprise locating a target element to which the metadata element applies as shown in block 322. Referring to the target document in Appendix I, the first web tag may correspond to "link" and may be a target element to which the metadata element is to apply.

The method can further comprise transforming a metadata element into a rendered element with a corresponding rendering instruction as shown in block 342. More particularly, the rendering instruction can be processed by the client computer 12 to replace the web tag with the span element.

Optional acts may be performed to calculate screen coordinates relative to the target document where the rendered element is to be displayed (block 362). The screen coordinates may be determined by a browser application operating on client computer 12. The method may further include an optional act of inserting the rendered element into the target document at the screen coordinates (block 364). Returning to the example, a red block having the word "Sean" within it may be place such that it appears to overlie "link."

The process continues to decision diamond 382 where a decision is made whether the target document includes any more elements. If yes, the method locates the next target element to which a metadata element applies (return to block 322). In this particular instance, "W3C" within the target document is located as the next target element, and the method can proceed with the acts as previously described and shown in blocks 342 362 and 364 of FIG. 3. Similar to the prior example, a red block having the word "Sean" within it may be placed such that it appears to overlie the "W3C." When there are no more elements ("NO" branch of the decision diamond 382), the method of modifying ends.

Figure 4:
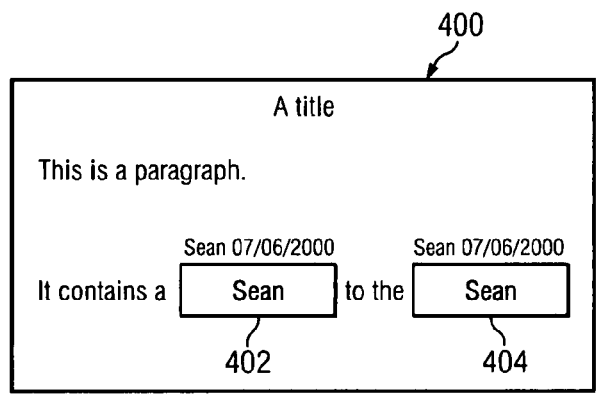
FIG. 4 includes an illustration of a frame with rendered elements that may be displayed to a user.

The client computer 12 may display a frame 400 including annotation blocks 402 and 404 as seen in FIG. 4. Note that the blocks 402 and 404 would be red. The "Sean 07/06/2000" above the blocks 402 and 404 may be used to show who and when the annotations were made. Note this information comes from the author and data parameters within the metadata.

In an embodiment not shown in FIG. 4, the metadata or rendering instructions may be modified to specify an opacity to the annotations. After inserting the rendered element, the rendered element overlies the target element, and the target element may be seen at least partially through the rendered element. For example, the blocks 402 and 404 may have only a 50% opacity that may allow the user at client computer 12 to see, although somewhat faintly, the underlying "link" and "W3C." Alternatively, 100% opacity may completely obscure the underlying "link" and "W3C."

The method can be adapted to a number of other different uses. For example, the rendered elements may be displayed as a row or a column of icons. These icons me be displayed near an edge of a frame at the client computer 12. In this embodiment (not shown), "link" and "W3C" would not be obstructed. In another implementation, the target element may include numerical information, such as a table of numbers. The metadata and rendering instructions may allow the transformation of the numerical information to be performed such that the rendered elements include a depiction of the numerical information. That depiction may include a representation all the numerical information in at least two dimensions. For example, a table of numbers may be displayed as a line graph, a bar chart, a pie graph, or the like. Each of these represents a two-dimensional depiction of the numerical information. In an alternative embodiment, three or more dimensions may be illustrated by the numerical information. For example, the numerical information may include a set of points that define a sphere, cylinder, cube, or other three-dimensional object. Additional dimensions may be represented.

HTTP and FTP protocols and file-system access that may be used within the method can be used with many different operating systems, such as Microsoft Windows™, UNIX™, Linux, MacOS™, or the like. The metadata and the rendering instructions may be accessed in a centralized manner that can support multiple, simultaneous users sharing the same metadata and rendering instructions.

The rendering agent may select rendering instructions independent of the selected metadata so that multiple renderings of the same metadata are possible. Additionally, the rendering agent may synthesize multiple sets of metadata to be displayed simultaneously in a single target document. Therefore, different combinations of metadata and rendering instructions are possible for a particular target document.

The rendering instructions can include program code that is included in the rendered elements. This may enable the rendered metadata to react to user actions. For example, a rendered element can be a small button, color-coded to indicate age of an in-line message. When the user clicks on the colored button at client computer 12, a window may appear with the full text of a message.

The metadata can include user-created annotations, links to other documents, statistics from Web server logs, or the like. Some examples can include hit counts, peak usage tie-ins, and more advanced analytics, such as most frequent links followed in the same visit, product-related information (e.g., total sales, largest cross sells, profit, returns, click-to-buy ratios, demographics of users associated with the content through purchases or requests for more information, or the like), and the like.

The use of the metadata and rendering instructions with the target document may allow more information, via annotations, different representations, etc., to be given to a user or set of users that may be at computers similar to client computer 12. By tailoring the information, the user may be able to understanding or more easily review the information than would otherwise occur. Simply put, the method can make a document more user-friendly, more informative, easier to track statistics, or any combination of them.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

APPENDIX I

Target Document
<html>
  <head> <title>A Web Page</title> </head>
  <body>
  <h1>A Title</h1>
  <p>
  This is a paragraph.
    It contains a <a href="http//www.w3c.org">link</a> to the <a href=http://www.w3c.org>W3C</a>

APPENDIX I-continued

```
    </p>
  </body>
</html>
```

APPENDIX II

```
Metadata
<?xml version="1.0" ?>
<WEBTAGS TARGET="http://www.awebsite.com">
<WEBTAG ID="42" LOCATION="body:0/h1:0" AUTHOR="Sean"
DATE="07/06/2000">
  This is an annotation that applies to the first heading of the DOM.
</WEBTAG>
<WEBTAG ID="5" LOCATION="body:0/p:0/a:1"
AUTHOR="Sean" DATE="07/06/2000">
  This is an annotation that applies to the second link in the first
paragraph of the DOM.
</WEBTAG>
</WEBTAGS>
```

APPENDIX III

```
Rendering Instructions
<?xml version="1.0" ?>
<xsl:stylesheet xmlns:xsl="http://www.w3.org/TR/WD-xsl">
<xsl:template match="/">
<xsl:apply-tempalates select="/WEBTAG" />
</xsl:template>
<xsl:template match="//WEBTAG">
<xsl:element name="SPAN">
<xsl:attribute name="bgcolor">RED</xsl:attribute>
<xsl:value-of select="@AUTHOR"/>
</xsl:element>
</xsl:template>
</xsl:stylesheet>
```

The invention claimed is:

1. A method of modifying a target document comprising:
accessing a first file comprising code renderable to produce a target document, a second file comprising a metadata element, and a third file comprising a rendering instruction, wherein the code comprises a target element;
locating the target element to which the metadata element applies by processing at least a portion of the code of the first file;
transforming the metadata element into a rendered element by using the rendering instruction, wherein the rendered element corresponds to the located target element to which the metadata element applies; and
displaying the rendered element in conjunction with the target element.

2. The method of claim 1, further comprising calculating screen coordinates relative to the target document where the rendered element is to be displayed.

3. The method of claim 2, further comprising displaying the rendered element in conjunction with the target document at the screen coordinates.

4. The method of claim 1, wherein locating further comprises matching a term within the metadata element with a corresponding term within the rendering instruction.

5. The method of claim 1, wherein the rendered element overlies the target element.

6. The method of claim 5, wherein the rendered element includes a row or column of icons.

7. The method of claim 5, wherein:
the target element includes numerical information;
the rendered element includes a depiction of the numerical information; and
the depiction includes a representation of the numerical information in at least two dimensions.

8. The method of claim 1, further comprising inserting the rendered element into the target document.

9. The method of claim 8, wherein:
when after inserting, the rendered element overlays the target element; and
the target element can be seen at least partially through the rendered element.

10. The method of claim 1, wherein a tag within the metadata element includes a locating information to locate the target element within the target document.

11. The method of claim 1, wherein the metadata element includes an identifier for the target document.

12. A data processing system readable medium having code embodied therein, the code including instructions executable by a data processing system, wherein the instructions are configured to cause the data processing system to perform a method of communicating with a user, the method comprising:
accessing a first file comprising code renderable to produce a target document, a second file comprising a metadata element, and a third file comprising a rendering instruction, wherein the code comprises a target element;
locating the target element to which the metadata element applies by processing at least a portion of the code of the first file;
transforming the metadata element into a rendered element by using the rendering instruction, wherein the rendered element corresponds to the located target element to which the metadata element applies; and
displaying the rendered element in conjunction with the target element.

13. The data processing system medium of claim 12, wherein the method further comprises calculating screen coordinates relative to the target document where the rendered element is to be displayed.

14. The data processing system medium of claim 13, wherein the method further comprises displaying the rendered element in conjunction with the target document at the screen coordinates.

15. The data processing system medium of claim 12, wherein locating further comprises matching a term within the metadata element with a corresponding term within the rendering instruction.

16. The data processing system medium of claim 12, wherein the rendered element overlies the target element.

17. The data processing system medium of claim 16, wherein the rendered element includes a row or column of icons.

18. The data processing system medium of claim 16, wherein:
the target element includes numerical information;
the rendered element includes a depiction of the numerical information; and
the depiction includes a representation of the numerical information in at least two dimensions.

19. The data processing system medium of claim 12, wherein the method further comprises inserting the rendered element into the target document.

20. The data processing system medium of claim 19, wherein:
when after inserting, the rendered element overlays the target element; and the target element can be seen at least partially through the rendered element.

21. The data processing system medium of claim 12, wherein a tag within the metadata element includes locating information to locate the target element within the target document.

22. The data processing system medium of claim 12, wherein the metadata element includes an identifier for the target document.

23. A method of modifying a target document comprising:
accessing a metadata element in a first file, wherein the metadata element specifies a corresponding target element;
searching code in a second file corresponding to a target document for the target element corresponding to the metadata element;
generating a rendered element based on the metadata element and a rendering instruction, wherein the rendered element corresponds to the target element to which the metadata element corresponds; and
displaying the target document, wherein displaying the target document includes displaying the rendered element and the target element in conjunction with one another.

24. A method of modifying a target document comprising:
accessing a first file comprising code corresponding to a target document, the code comprising a set of target elements, a second file comprising a metadata element applying to at least one of the set of target elements, and a third file comprising a rendering instruction corresponding to the metadata element and describing how the metadata element is to be transformed;
locating the at least one target element to which the metadata element applies by processing the code corresponding to the target document;
transforming the metadata element into a rendered element according to the rendering instruction wherein the rendered element corresponds to the located target element to which the metadata element applies; and
displaying a rendered target document, wherein the rendered target document comprises the rendered element and the rendered target element.

25. A method of modifying a target document comprising:
obtaining a metadata element, wherein obtaining a metadata element comprises accessing a first file comprising a set of metadata elements, each of the metadata elements corresponding to one or more target elements;
locating the one or more target elements to which the metadata element corresponds, wherein locating the one or more target elements comprises accessing a second file comprising code operable, when rendered, to present a target document and processing a portion of the code to locate the one or more target elements;
locating a rendering instruction corresponding to the metadata element, wherein locating the rendering instruction comprises accessing a third file comprising a set of rendering instructions;
generating a rendered element based on the metadata element and a rendering instruction, wherein the rendered element corresponds to the located target element to which the metadata element applies; and
displaying the rendered element in conjunction with the one or more corresponding target elements when rendering the target document.

26. The method of claim 25, wherein the location of the second file is specified in the third file.

27. The method of claim 26, wherein the metadata element specifies the location of the one or more corresponding target elements in the code of the second file.

28. The method of claim 27, wherein processing the portion of the code comprises parsing the portion of the code.

29. The method of claim 28, wherein the code comprises a set of tagged elements and the set of tagged elements comprises the one or more target elements.

30. The method of claim 29, wherein the metadata element identifies the one or more target elements.

31. The method of claim 30, wherein the rendering instruction comprises program code.

\* \* \* \* \*